United States Patent [19]

Walters et al.

[11] Patent Number: 4,786,622
[45] Date of Patent: Nov. 22, 1988

[54] REGENERATION OF FLUID SOLID PARTICLES AND SEPARATION OF SOLID PARTICLES FROM COMBUSTION PRODUCT FLUE GASES

[75] Inventors: Paul W. Walters; William M. Rice, both of Ashland, Ky.

[73] Assignee: Ashland Oil, Inc., Ashland, Ky.

[21] Appl. No.: 568,998

[22] Filed: Jan. 9, 1984

[51] Int. Cl.$^4$ .................. B01J 21/20; B01J 29/38; C10G 11/18; B07B 7/04
[52] U.S. Cl. .................................... 502/44; 55/342; 208/161; 208/164; 209/138; 209/143; 422/144; 502/21; 502/41
[58] Field of Search ............................ 502/21, 41–44; 208/164, 155, 156, 161; 422/144, 145; 209/138–144; 55/342

[56] References Cited

U.S. PATENT DOCUMENTS

| 2,377,657 | 6/1945 | Watts | 502/44 |
|---|---|---|---|
| 4,266,673 | 5/1981 | Haidlen et al. | 209/141 |
| 4,313,910 | 2/1982 | Dries et al. | 209/143 |
| 4,336,160 | 6/1982 | Deam et al. | 422/145 |
| 4,364,905 | 12/1982 | Fahrig et al. | 422/144 |
| 4,374,750 | 2/1983 | Vickers et al. | 208/164 |

Primary Examiner—Paul E. Konopka
Attorney, Agent, or Firm—Richard C. Willson, Jr.; James L. Wilson

[57] ABSTRACT

A method and arrangement of apparatus employed is described for regenerating solid particles comprising carbonaceous deposits. At least three sequential stages of separation of flue gases from entrained solids are provided in association with an upflow catalyst regeneration operation.

18 Claims, 1 Drawing Sheet

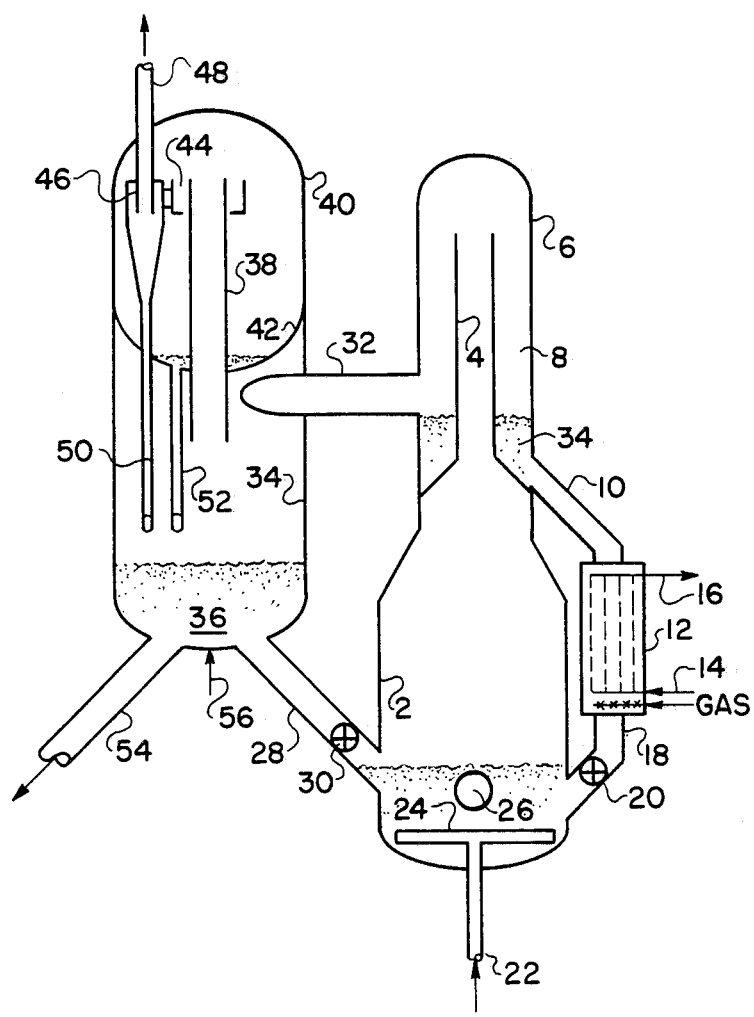

REGENERATION OF FLUID SOLID PARTICLES AND SEPARATION OF SOLID PARTICLES FROM COMBUSTION PRODUCT FLUE GASES

BACKGROUND OF THE INVENTION

The conversion of gas oils and higher boiling portions of crude oils referred to as residual, reduced crudes or resids by thermal and catalytic processes employing fluidizable solid particle material has been discussed in numerous published articles and is the subject of considerable prior patent art. Some petroleum refiners consider some heavy oil cracking operations to be a practical and profitable operation. However, it is generally agreed that as you increase the end boiling point of the heavy oil feed so also does it aggrevate the fluid contact operation by the accumulation of metal contaminants and carbon producing components such as asphaltene type material contributing to Conradson carbon when the feed end point is increase beyond about 538° C. or 552° C. (1000° F. or 1025° F.).

Fluid cracking units and particularly fluid catalytic cracking technology has improved dramatically over the past twenty years as well as the apparatus in which accomplished particularly with the development of high activity crystalline zeolite cracking catalyst considered more heat stable than the amorphous cracking catalyst earlier employed permitted increasing the severity of the cracking operation to a level restricted substantially by the heat available in a given refinery operation. The heat available in any given operation is dependent upon the carbon burning capacity of the system and the metallurgical limits imposed on the catalyst regeneration (combustion) section of the refinery cracking system. Providing additional available heat by combustion of some Conradson carbon carbonaceous deposits will usually permit expansion of its cracking capacity. This method has been employed by many refiners since the zeolite catalysts tend to produce less coke and high boiling recycle material whereby the feed end point and throughput to the cracking unit may be increased. A further significant improvement contributing to increased feed throughput and thus yields has been the result of improved catalyst regeneration techniques. High regeneration temperatures tend to permit one to lower the residual carbon level on the regenerated catalyst particles and this lowers the catalyst to oil ratio employed in the hydrocarbon conversion zone. The catalyst regeneration operations have been improved to include complete CO combustion in the presence of heat absorbing catalyst particles whereby the undesired condition of after burning can be eliminated.

However, as these advancements were made so also were there some disadvantages experienced by the higher regeneration temperatures when exceeding about 704° C. or 760° C. (1300° F. or 1400° F.). That is, the apparatus encountering the high temperature regeneration operation, such as flue gas ducting valves, VGO boilers, etc. all required metallurgical upgrading in combination with being provided with refractory lining materials suitable for the temperatures encountered. Thus, the combinations of improved alloys and carbon steel suitably refractory lined has permitted prior art regeneration technology to contemplate and encounter temperatures within the range of 704° C. to 871° C. (1300° F. to 1600° F.) but more usually not above about 815° C. (1500° F.). In fact, it is generally preferred to restrict regeneration temperatures not to exceed about 732° C. (1350° F.) to preserve catalyst activity. It was also learned that the catalyst had to remain in a regenerator long enough to allow desired carbon burn off and the carbon burning rate was influenced by the combination of oxygen partial pressure therein and the temperature available to achieve rapid ignition of carbonaceous material on charged spent catalyst. The higher temperature catalyst regeneration operation imposed further hardships on the particles of catalyst contributing to the production of considerable catalyst fines exiting with the flue gas products of combustion. Such flue gas containing particle fines have caused considerably undesired impact upon the surrounding environment. Furthermore, the flue gases contain particulates which are both condensible and solid particulate matter of considerable cracking activity. The loss of such active cracking catalyst fines requires replacement and reduces the economic value of the cracking process.

The present invention is concerned with the method and means for regenerating fluidizable solid particle material whether inert or catalyst particles whereby the removal of deposited carbonaceous material from the particles is achieved to a desired low level and the recovery of heated catalyst particles including formed catalyst fines are recovered at a sufficiently high order of magnitude to meet very strict opacity standards and solids loss criteria effecting the cracking process economics.

SUMMARY OF THE INVENTION

The present invention is concerned with the regeneration of fluidizable solid particle material which may or may not comprise catalytic activity to effect removal of associated coke carbonaceous or hydrocarbonaceous deposits. More particularly, the present invention is concerned with the regeneration of fluid solid particle material in an apparatus arrangement of desired restricted particle inventory under combustion temperature constraints minimizing hydrothermal deactivation of the fluid solid particles. In yet another aspect, the present invention is directed particularly to the recovery of fluid particles entrained with high temperature flue gases sufficient to satisfy severe opacity testing of discharge flue gases. In a more particular aspect, the regeneration technique comprising this invention employs an interrelationship of operating parameters comprising the recycle of high temperature solid fluid particles to the regeneration operation in ratios with charged coked particles promoting rapid combustion of the charged coke by direct heat exchange therewith in an upwardly flowing mass of fluid solid particles of decreasing particle concentration in the direction of combustion flue gas product recovery. In yet another aspect, the improved regeneration operation of this invention is directed to utilizing a concentration of coked solid particles admixed with high temperature regenerated solid particles providing a relatively dense upflow mass thereof in suspending combustion promoting gaseous materials. The gaseous materials have an oxygen concentration sufficient to achieve rapid combustion of coke (carbonaceous) deposits and formed CO in the presence of a high concentration of the solids heat absorbing particles before achieving a more dilute suspended concentration of solid particles in combustion product flue gases less than about 35 pounds per cubic foot. Thus, the combustion of coke deposits and consumption of charged oxygen containing gas in the upflowing suspension of spent and regenerated fluid solid particles is selected to complete CO combustion and particularly avoid the phenomenon of afterburning of combustibles in a downstream more dilute phase of the flue gas -entrained solids separation system of the regeneration operation.

The regeneration technique and arrangement of apparatus of the present invention is particularly useful in the regeneration of low coke producing crystalline aluminosilicate (zeolite) hydrocarbon conversion catalysts when processing hydrocarbon feeds of little or no Conradson carbon producing components. On the other hand, the regeneration technique of the present invention is particularly useful when converting high boiling residual oils comprising substantial Conradson carbon producing components whether employed in single or multiple stages of coke combustion during catalyst regeneration. The regeneration technique of the invention relies substantially upon the mixing of hot regenerated catalyst particles of selected temperature in combination with catalyst particles containing carbonaceous deposits to provide at least a 1:1 ratio thereof. The mixture thus formed in the presence of oxygen containing combustion supporting gases forms an upflowing fluid mass of catalyst particles providing a particle concentration initially within the range of about 3 to 35 pounds/cu.ft. The upflowing fluid mass of catalyst particles suspended in flue gas and combustion supporting gas is preferably at an elevated coke combustion temperature initially promoting rapid ignition of the coke (carbonaceous) deposits and preferably the catalyst mixture is at a temperature of at least about 649° C. (1200° F.). The removal of deposited carbonaceous material is rapidly initiated and accomplished in conjunction with the combustion of formed carbon monoxide to form some CO2 thereby rapidly heating the catalyst in seconds up to a more elevated temperature of at least about 704° or 732° C. (1300° or 1350° F.) and up to a temperature within the range of about 760° to 815° C. (1400° to 1500° F.). If is preferred for metallurgical reasons that the temperature be restricted below 871° C. (1600° F.) and preferably below 815° C. (1500° F.). However, it is contemplated employing the more elevated temperature up to about 871° C. (1600° F.) in some special operations processing relatively high Conradson carbon producing feed. In such a high temperature operation the combination of special alloys and refractory linings may be used alone or in combination with some flue gas quench sufficient to achieve desired metallurgical constraints.

Some significant features of the regeneration technique and apparatus arrangements of the invention are concerned with effecting substantial removal of carbonaceous deposits to a residual coke level not above about 0.10 weight % and as low as about 0.05 wt% or lower in an upflowing catalyst particle regeneration system at a particle concentration less than about 35 pounds per cubic foot down to about 2 or 10 pounds per cubic foot before obtaining a more dilute transport suspension thereof.

Separating product combustion flue gases from entrained high temperature catalyst particles is a particularly novel part of the combination operation of the invention.

The combustion supporting oxygen containing regeneration gases are charged in a major portion to a bottom portion of the regeneration coke combustion zone of highest particle concentration where mixing of spent and regenerated catalyst particles is accomplished as herein described. The amount of oxygen containing gas introduced in the upflowing fluid mass of catalyst particles in the bottom portion thereof as desired may be varied considerably to adjust the particle concentration or dispersion density of the catalyst mixture in the upflowing catalyst suspension regeneration phase. Thus, initial regeneration of coke contaminated catalyst particles is accomplished at an initial elevated temperature of at least 677° C. (1250° F.) or higher in a bottom section of highest particle concentration permitting general upflow of the formed mass of catalyst particles to an upflowing superimposed less dense phase of catalyst particles in direct contact with combustion supporting gas in a confined passageway communicating with a larger diameter catalyst particle-flue gas separation zone about the upper end of said confined passageway. Conversion of formed carbon monoxide to carbon dioxide is preferably accomplished in the confined passageway and prior to discharge of the upflowing regenerated catalyst suspension from the confined passageway.

Flue gases partially separated from entrained catalyst particles in said enlarged zone are passed to a second separate separation zone by tangential introduction thereto whereby centrifugal separation of entrained catalyst particles is encouraged as the flue gas velocity is reduced therein. High temperature catalyst particles thus centrifugally separated from flue gases are collected in a bottom portion of the enlarged separation vessel. High temperature catalyst particles thus recovered from the flue gases and collected as a mass of high temperature catalyst is available for recycle to a hydrocarbon conversion zone as well as recycle to the regeneration operation as more fully discussed below. In the event residual coke on the regenerated catalyst is too high, it is contemplated effecting a further contact of the hot catalyst particles with an oxygen containing gas in a bottom portion of the enlarged separation vessel zone under dense fluid bed retaining velocity conditions so that the carry over of catalyst particles into a superimposed dispersed catalyst phase will be held to a very low desired order of magnitude.

A third flue gas-entrained cataylst particle fines separation chamber provided with catalyst fines separation means is provided adjacent to and above the centrifugal separation chamber above discussed and in open communication therewith by an upwardly extending open end flue gas transfer or riser conduit passageway extending from beneath a baffle member in an upper portion of the centrifugal separation chamber into an upper portion of a flue gas-entrained fines separation chamber thereabove. Flue gases passed upwardly through this transfer or open end riser conduit and comprising particularly some entrained catalyst fines are passed at a velocity which encourages upon discharge from the upper open end thereof a momentum differential separation between the flue gases and solid particle fines so that flue gases further reduced in entrained solid fines may be recovered by an annular passageway, open in its upper end and about the riser discharge open end. The flue gases thus separated and recovered are passed from said annular passageway by a plurality of confined passageways to a plurality of cyclone separating means adjacent thereto and in open communication therewith. The ultimate separation of entrained fines from flue gases is achieved in the plurality of cyclones before recovery therefrom for further use as herein provided.

Catalyst particles separated by momentum differential and those separated by provided cyclones are collected and passed to the bed of catalyst particles collected in a bottom portion of the enlarged centrifugal separation zone above discussed.

It will be immediately clear to those skilled in the art that the novel and essential features of the regeneration system of the present invention incorporate the rapid ignition of deposited carbonaceous material on spent catalyst particles in a combustion zone by admixture with more elevated temperature regenerated catalyst particles and combustion supporting gas in a generally upflowing catalyst particle suspension system in combination with a downstream sequence of flue gas-entrained catalyst particle separation steps providing a more optimum recovery of regenerated catalyst particles from a regeneration product flue gas satisfying severe opacity tests. In addition to the above, catalyst particles initially separated from flue gas following traverse of the upflowing catalyst particle regeneration operation are collected as an annular bed of catalyst particles. A portion of this collected annular catalyst bed is thereafter passed through a catalyst cooler wherein high pressure steam is generated before return of partially cooled regenerated catalyst particles to a bottom portion of the regeneration zone for admixture with spent catalyst charged thereto. On the other hand, a portion of the annular bed of catalyst may be passed directly to the bottom of the regeneration zone without cooling as desired by means not shown.

It will be further observed that the sequence of flue gas-entrained catalyst separation steps of the invention are a sequence of elutriation steps which particularly optimize the separation conditions in each step thereof to particularly facilitate the operation and recovery of catalyst particles from flue gases of decreasing particle concentration charged thereto with the flue gases.

It is acknowledged that the concentration density of catalyst particles in gaseous materials may be over a wide range and selected for gas velocities within the range of 4 to 80 ft/sec. However, the suspensions formed pass through zones of increasing velocity and decreasing particle concentration down to minute amounts thereof.

The heating of catalyst particles by combustion of carbonaceous material in a combustion zone to a temperature within the range of 732° C. (1350° F.) up to 815° C. (1500° F.) or as high as 871° C. (1600° F.) is accomplished in a relatively short time frame and in an amount required to provide the needed endothermic heat of conversion of a gas oil feed or a heavier residual oil feed comprising Conradson carbon contributing material in a hydrocarbon conversion zone not shown. Thus, the operating parameters employed in the regeneration systems of this invention may be varied over a relatively wide range and will vary with the oil feed converted. The length and diameter of the primary combustion regeneration zone may be varied to best accomplish the desired operating parameters herein discussed. The weight ratio of regenerated to spent catalyst particles may be varied within the range of 1–5, the regeneration zone may be generally tapered inwardly above a bottom portion thereof before discharge into the first of the sequence of enlarged catalyst particles separation and collection zones. The size of the first and second catalyst separation zones downstream of the catalyst coke combustion or regeneration zone may be varied considerably to achieve a desired accumulation of catalyst particles in each zone for use as herein provided.

In another embodiment of this invention, it is contemplated passing collected annular bed catalyst from said first separation zone to a riser hydrocarbon conversion zone not shown.

BRIEF DESCRIPTION OF THE DRAWING

The drawing is a diagrammatic sketch in elevation of one arrangement of apparatus for effecting regeneration of coked catalyst particles and comprising a sequence of catalyst-flue gas recovery steps.

DISCUSSION OF SPECIFIC EMBODIMENTS

Referring now to FIGURE I there is shown a regeneration vessel or coke combustion chamber 2 of larger diameter in a bottom portion thereof than in an upper portion and terminating in an upwardly extending smaller diameter open end conduit 4 which terminates in an upper portion of an upwardly extending separate second vessel or chamber 6 of large diameter than conduit 4 and providing an annular section 8 therewith. A conduit 10 or standpipe extends downwardly from said annular zone or section 8 external to vessel 2 and in open communication with a heat exchange chamber zone 12 to which heat exchange fluid is charged by conduit 14 to tubular heat exchange means provided therein for indirect heat exchange with downwardly flowing solids passing through chamber 12. The heat exchange fluid comprising steam is recovered by conduit 16. Partially cooled catalyst solids are passed from the bottom of chamber 12 by conduit 18 comprising flow control valve 20 to a lower bottom portion of vessel 2. Regeneration gas such as air or other suitable oxygen containing regeneration gas is charged to the bottom portion of chamber 2 by conduit communicating with gas distributor means 24. Opening 26 in vessel wall 2 is provided for charging spent catalyst of hydrocarbon conversion comprising carbonaceous deposits to the lower portion of the regeneration chamber 2. Hot regenerated catalyst particles obtained as herein discussed are passed as required by conduit 28 comprising flow control valve 30 to a lower bottom portion of chamber 2 for admixture with particles introduced thereto by opening 26 and conduit 18 whereby a mixture of spent and regenerated catalyst particles is formed as herein provided at a temperature promoting combustion of carbonaceous deposits on catalyst particles.

A mixture of spent and regenerated catalyst particles formed in the lower portion of vessel 2 is in a ratio providing a mix temperature of at least 649° C. or 663° C. (1200° F. or 1225° F.). The thus formed mixture is contacted with charged oxygen containing regeneration gas such as air or an oxygen modified gas to form an upflowing mass of suspended catalyst particles of a desired particle concentration initially in the range of 3 to 35 lbs/cu.ft. or in a range of 10 to 20 lbs/cu.ft. In this catalyst regeneration environment, the concentration of oxygen provided in the upflowing suspension and temperature profile maintained are selected to maintain a catalyst regeneration temperature within the range of 732° C. (1350° F.) up to about 815° C. (1500° F.) and preferably below about 787° C. (1450° F.). Higher temperatures up to 871° C. (1600° F.) may also be employed in some special cases as herein briefly discussed. Regeneration of the catalyst by burning combustible material such as carbonaceous deposits of hydrocarbon conversion and formed CO is particularly and desirably accomplished within the combustion regeneration vessel or chamber 2 prior to exiting therefrom by passageway 4. Thus, it is desirable to minimize or avoid CO after burning in the upper more dilute phase of the separation zone comprising chamber 6. If need be, some steam quench of flue gas combustion products may be accomplished in the upper dispersed phase of chamber 6.

A reversal in the direction of the flue gas-catalyst suspended flow following discharge from the upper open end of passageway 4, to a downward direction is accomplished in a top portion of vessel 6 into the annular chamber 8 about confined passageway 4. This downflow in annular zone 8 causes substantial separation of entrained articles of catalyst to occur as the flue gases are withdrawn generally horizontally from the annular zone by conduit or passageway 32 positioned generally perpendicular thereto. Thus, an annular mass of catalyst is collected in a lower portion of annular chamber 8 beneath withdrawal conduit 32 as a mass of catalyst 34. Accumulated hot regenerated catalyst particles thus collected as bed 34 are withdrawn by conduit 10 for passage downwardly through heat exchanger 12 and thence by conduit 18 to a bottom portion of vessel 2 as above discussed. Heat exchanger 12 is normally a catalyst cooler during on-stream operation.

Flue gases recovered from annular zone 8 by conduit 32 and comprising a substantial amount or entrained catalyst particles is thereafter discharged tangentially into a relatively large diameter catalyst separation and collection chamber 34. The tangential introduction of the flue gas-catalyst suspension into an upper portion of chamber 34 further effectively separates entrained catalyst particles from flue gases of reduced velocity by centrifugal momentum. This is accomplished in combination with a substantial reduction in the flue gas velocity promoting settling of centrifugally separated catalyst particles from flue gas and thus is encouraged to occur. Catalyst particles thus separated in chamber 34 are collected in a bottom portion thereof as a relatively dense mass or bed of high temperature regenerated catalyst particles 36.

Flue gases centrifugally separated from a major portion of entrained catalyst particles except for the finest of catalyst particles is caused to flow from an upper dispersed phase above bed 36 with flue gases upwardly through an open end confined passageway or conduit 38 discharging into the upper portion of a separate third chamber or zone 40 adjacent to but above chamber zone 24. A common head member 42 separates chamber 40 from chamber 34.

The flow rate of flue gas and entrained catalyst fines passed upwardly through conduit 38 is of a velocity selected to particularly promote ballistic separation thereof whereby a momentum differential established between catalyst fines and flue gases permits the flue gases to be separated from catalyst fines and be withdrawn into an annular zone 44 and thence be transferred to cyclones represented by cyclone 46 for further separation therein of catalyst solid fines from flue gases. Flue gases thus separated from solid fines are removed by conduit 48. Catalyst particle fines separated by a plurality of cyclones 46 are passed by diplegs 50 to the bed of catalyst 36 in a bottom portion of chamber 34. Catalyst particles separated from flue gases by ballistic separation as above described upon discharge from riser confined passageway 38 are collected in a bottom portion of chamber 40 for passage by dipleg or standpipe 52 to the bed of catalyst 36 in chamber 34. Conduit 54 is provided for withdrawing regenerated catalyst particles from bed 36 for transfer to a hydrocarbon conversion zone not shown such as a riser hydrocarbon conversion zone. Spent catalyst particles comprising carbonaceous deposits of hydrocarbon conversion recovered from a conversion zone are passed following stripping thereof to inlet 26 of the primary regeneration zone for regeneration thereof as discussed above.

It is contemplated in one specific embodiment of providing conduit means not shown for passing catalyst particles from the annular zone 8 bed 34 directly into a bottom portion of regeneration chamber 2 rather than pass through heat exchanger 12 as above discussed. In yet another embodiment, it is contemplated adding fluidizing or fluffing gas to a bottom portion of bed 36 by conduit 56 which gas may or may not comprise combustion supporting amounts of oxygen therein in the event that some further residual coke burning is desired to be accomplished in bed 36. In yet another aspect, it is contemplated adding fluffing gas to a lower portion of annular catalyst bed 34 by conduit means not shown which may or may not comprise comprise combustion supporting amounts of oxygen in the event undesired amounts of residual carbon remain on the regenerated catalyst.

It is thus evident that the combination promoting carbon combustion and separation of catalyst particles from flue gases as above discussed comprises many unique processing steps and apparatus features. Some of these features include (a) a steam producing catalyst cooler in association with the upflow coke combustor-catalyst regeneration zone; (b) a relatively high temperature upflowing suspended catalyst regeneration zone of limited catalyst particle inventory; (c) utilization of regenerated catalyst and partially cooled regenerated catalyst as required in combination with spent coke deactivated catalyst particles in a ratio providing a mix temperature promoting rapid initial combustion of charged hydrocarbonaceous deposits on the spent catalyst and referred to as coke and/or carbonaceous material; (d) at least four sequential stage of flue gas-entrained or suspended catalyst separation steps of decreasing pressure and catalyst concentration in flue gases in the direction of flow in combination with increasing flue gas flow velocity variations promoting the separation of entrained catalyst fines through the sequence of separation steps; and (e) directional changes in the flue gas-entrained catalyst separation steps promoting centrifugal separation intermediate downflow and upflow ballistic separation of entrained particles from flue gas products of combustion.

In a more particular aspect, the regeneration apparatus arrangement of the drawing and associated downstream separation steps may be maintained within the following specific ranges of operating conditions. That the concentration of solid particles in combustion supporting gas in a bottom portion of the combustor 2 may be within the range of 3 to 35 lbs/cu.ft. However, as the formed suspension passes upwardly through the diminishing diameter combustor regeneration zone, the concentration of solid particles in the combustion product gases or flue gases is reduced and may be within the range of 1 to 5 lbs/cu.ft. at the upper discharge end of the combustor section 4. In the annular zone 8, substantial separation of entrained solid particles is accomplished so that the flue gases passed through horizontal passageway 32 may comprise a solid particle concentration within the range of about 0.5 to about 1.0 lbs/cu.ft. Centrifugal separation of the flue gas-solids suspension discharged tangentially for centrifugal separation in zone 34 further reduced the concentration of solids in the flue gases passed upwardly through riser 38 to within the range of 0.2 to 0.5 lbs/cu.ft. at the riser upper open end.

It will be recognized by those skilled in the art that the concentration of solids in the transporting gaseous material passed through the system may be considerably varied to include particle concentration outside the ranges above identified and such variations are considered to be within the essence and scope of the present invention.

Having thus described the improved regeneration method and means of the invention and specifically described example in support thereof. It is to be understood that no undue restrictions are to be imposed by reason thereof except as defined by the following claims.

What is claimed is:

1. A method for removing carbonaceous deposits from fluid solid particles and separating entrained solid fines from combustion product flue gases which comprises:
    (a) forming a mixture of solid particles comprising carbonaceous deposits with sufficient hot regenerated solid particles to form a mixture thereof at a temperature of at least 649° C. (1200° F.) dispersed in suspension forming combustion supporting oxygen containing gas at a particles concentration within the range of 3 to 35 lbs/cu.ft.;
    (b) passing the suspension mixture thus formed in (a) upwardly through a combustion zone as a suspension under conditions selected to restrict combustion temperatures thereof below 871° C. (1600° F.);
    (c) discharging the upwardly flowing gas-solids suspension in combustion product flue gases as a confined stream into a zone in open communication with an annular zone about said confined stream, directing the discharged suspension downwardly through said annular zone at a velocity whereby entrained particles solid are separated from combustion flue gas by withdrawing flue gas radially from said annular zone by an open ended confined passageway extending outwardly from above a collected bed of solid particles in a lower bottom portion of said annular zone;
    (d) passing hot regenerated solid particles from a bottom portion of said annular zone through a heat exchange zone and thence to a bottom portion of said combustion zone for admixture with spent solid particles as in above;
    (e) discharging glue gas with entrained solid particles from said generally horizontal confined passageway tangential into the upper part of a second separate flue gas-entrained solids particle separation zone and recovering centrifugally separated solid particles as a dense fluid mass in a bottom portion of said second separation zone;
    (f) passing separated flue gases comprising entrained solid fines from an upper part of said second separation zone upwardly through an open end elongated confined riser transport zone discharging upwardly into a third separation zone under velocity conditions establishing a momentum differential between entrained solid fines and combustion product flue gases;
    (g) collecting solids separated by momentum from flue gases in a bottom portion of said third separation zone and transferring solids thus collected to the mass of solids collected in a bottom portion of said second separation zone;
    (h) passing flue gas separated from solids particles in said third separation zone through an annular passageway in open communication with a plurality of attached cyclone separation zones wherein any entrained solid fines are further separated from the flue gases before effecting recovery of flue gases from said cyclone separation zones;
    (i) passing cyclone separated solid fines directly to the collected mass of solid particles in a bottom portion of the second separation zone;
    (j) passing particles collected in a bottom portion of said second separation zone to a bottom portion of said combustion zone for admixture with solid particles charged thereto; and
    (k) withdrawing collected regenerated solid particles from said second separation zone for use in a hydrocarbon conversion zone.

2. A method for regenerating solid fluid particles comprising carbonaceous deposits by combustion and recovering flue gases of combustion separated from particle fines which comprises:
    (a) passing solid fluid particles comprising carbonaceous deposits admixed with regenerated solid particles in combustion supporting fluidizing gas as a suspension upwardly through a combustion zone at a temperature restricted to within the range of 649° C. to 815° C. (1200° F. to 1500° F.), thereby producing hot combustion product flue gases;
    (b) passing a suspension of said heat combustion product flue gases comprising entrained solid particles through a sequence of separation zones comprising an annular downflow flue gas-solids suspension separation zone, a centrifugal flue gas-solids suspension separation zone and a flue gas-entrained solids suspension upflow ballistic separation zone;
    (c) passing separated solids from each of said annular separation zones and said centrifugal solids separation zone to said combustion zone; and
    (d) removing hot regenerated solids from said centrifugal solids separation zone for use in a hydrocarbon conversion zone.

3. The method of claim 2 wherein the solid fluid particles are selected from catalytic solids, catalytically relatively inert solids or a combination thereof.

4. The method of claim 2 wherein the upflowing mixture of suspended solids in the combustion zone are in an upflowing particle concentration within the range of about 35 lbs/cu.ft. down to above 5 or 1 lbs/cu.ft. before being discharged as a confined stream and directed downwardly through said annular zone.

5. The method of claim 2 wherein flue gases with a lesser amount of entrained solids are removed from said annular zone by said radiating passageway and thereafter are centrifugally separated from solids by tangential introduction into an enlarged separation and solids collection zone.

6. The method of claim 5 wherein flue gas comprising a lesser amount of entrained solid fines pass from said enlarged centrifugal separation zone upwardly through an open ended confined passageway under velocity conditions promoting ballistic separation and separation between solids and flue gases upon discharge from the upper open end thereof.

7. The method of claim 2 wherein collected solids removed from a lower portion of said annular zone pass downwardly through an indirect heat exchange cooling zone before return to a lower portion of said combustion zone.

8. The method of claim 2 wherein solids removed from said annular zone are employed to produce steam in a heat exchange solids cooling zone before return to said combustion zone and solids separated and recovered in said centrifugal separation zone from flue gases are passed without cooling to said combustion zone.

9. The method of claim 6 wherein flue gases separated from entrained solid fines by upflow ballistic separation pass through cyclone separation zones for separation of entrained fines from flue gases sufficient for the flue gases to satisfy opacity tests with respect to occluded fines upon removal of flue gases from said cyclones.

10. A method for separating combustion product flue gases from entrained particles of catalyst recovered from an upflowing fluid catalyst particles suspension regeneration zone which comprises:
   (a) passing a suspension of hot regenerated catalyst particles in combustion product flue gases obtained from a catalyst regeneration zone downwardly through an annular separation zone whereby separation and recovery of flue gases of reduced entrained catalyst particles is obtained from a downflowing concentration of catalyst particles;
   (b) passing flue gases recovered from said annular zone tangentially into a second cylindrical separation zone under velocity conditions centrifugally separating entrained catalyst particles from said flue gases, recovering centrifugally separated particles as a mass of particles in a bottom portion of said second separation zone separately from flue gases;
   (c) passing centrifugally separated flue gas of reduced particle concentration upwardly from said second separation zone through an open confined passageway at a velocity providing ballistic separation thereof upon discharge therefrom whereby the flue gases become further separated from entrained catalyst particles fines and flue gases thus separated thereafter pass through cyclone separation zones before being separated from the regeneration operation; and
   (d) passing regenerated catalyst particles recovered from each of said sequence of separation steps to a bottom portion of said regeneration zone for admixture with charged spent catalyst particles and combustion supporting, suspension forming, fluidizing gaseous material.

11. The method of claim 10 wherein the mixture of spent catalyst particles and regenerated catalyst particles admixed with combination supporting gaseous material is passed upwardly through said regeneration zone at a temperature below 871° C. (1600° F.) and a particle concentration within the range of 1 to 35 lbs/cu.ft.

12. The method of claim 10 wherein the suspension of combustion product flue gases comprising entrained catalyst particles charged to said annular separation zone is at a temperature within the range of 760° C. to 871° C. (1400° F. to 1600° F.) and catalyst particles separated from flue gases in said annular zone are used to generate steam in a heat exchange zone before recycle to a bottom portion of said regeneration zone.

13. The method of claim 10 wherein the catalyst particles separated in the annular zone and the centrifugally separated catalyst particles are separately recycled to said regeneration zone.

14. The method of claim 10 wherein the combustion of CO formed in the regeneration zone is completed in said upflowing catalyst regeneration zone and the temperature therein is restricted to within the range of 649° C. to 815° C. (1200° F. to 1500° F.).

15. The method of claim 10 wherein the temperature of the regeneration zone and catalyst passed therethrough is restricted not to exceed about 787° C. (1450° F.).

16. The method of claim 10 wherein the flue gases recovered from the regeneration zone pass through the sequence of separation zones with a decreasing concentration of catalyst particles and recovery of flue gases from the final cyclone separation zones downstream of said upflow ballistic separation are the lowest pressure zones in the sequence of separation zones.

17. The method of claim 10 wherein there is a directional change in the flue gas comprising suspended solid particles in said step (b) providing for centrifugal separation of solids from flue gases intermediate downflow ballistic separation of entrained solids from flue gases in said step (a) and upflow ballistic separation of entrained solids from flue gases in said step (c).

18. The method of claim 17 wherein the downflow ballistic separation of solids from flue gases in said step (a) is accomplished with a solids concentration in the range of 1 to 5 lbs/cu.ft.; the centrifugal separation of solids from flue gas in said step (b) is accomplished with a solids concentration in the range of 0.2 to 0.5 lbs/cu. ft. at said discharge from said open confined passageway in said step (c) prior to passing flue gases through cyclone separation.

* * * * *